United States Patent [19]

Auerbach et al.

[11] Patent Number: 5,079,340
[45] Date of Patent: Jan. 7, 1992

[54] STABILIZED POLYKETONE POLYMERS

[75] Inventors: Andrew B. Auerbach, Livingston; Stephen J. Hanley, Whippany, both of N.J.

[73] Assignee: Shell Oil Company, Houston, Tex.

[21] Appl. No.: 693,192

[22] Filed: Apr. 30, 1991

[51] Int. Cl.$^5$ .............................................. C08G 67/02
[52] U.S. Cl. ................................... 528/392; 524/255; 524/361; 525/201; 525/221
[58] Field of Search ............... 524/255, 361; 525/201, 525/221; 528/392

[56] References Cited

U.S. PATENT DOCUMENTS

| | | | |
|---|---|---|---|
| 2,495,286 | 1/1950 | Brubaker | 260/63 |
| 3,694,412 | 9/1972 | Nozaki et al. | 260/63 CQ |
| 4,141,877 | 2/1979 | Luttinger et al. | 260/37 |
| 4,731,397 | 3/1988 | Auerbach et al. | 523/439 |
| 4,783,494 | 11/1988 | Allen | 524/139 |
| 4,843,144 | 6/1989 | Van Broekhoven et al. | 528/392 |
| 4,871,810 | 10/1989 | Saltman | 525/133 |
| 4,874,801 | 10/1989 | George et al. | 523/214 |
| 4,874,819 | 10/1989 | George et al. | 525/185 |
| 4,880,903 | 11/1989 | Van Broekhoven et al. | 528/392 |

FOREIGN PATENT DOCUMENTS 1081304  8/1967  United Kingdom .

OTHER PUBLICATIONS

Development in Ionic Polymers, A. Wilson and H. Prosser, Chapter 1, pp. 1-34, Applied Science Publishers, London.

Journal of Polymer Science: Part A: Polymer Chemistry, vol. 24, 3191-3199 (1986), R. Gooden et al.

*Primary Examiner*—Paul R. Michl
*Assistant Examiner*—Tae H. Yoon
*Attorney, Agent, or Firm*—James O. Okorafor

[57] ABSTRACT

A thermoplastic polyketone polymer composition having thermoset properties, processes for its production, and articles made thereof are disclosed. This composition also having improved continuous use temperature and thermal stability properties can be produced by crosslinking, at elevated temperatures, a thermoplastic polyketone resin with a suitable basic material. Optionally, suitable lubricants or fillers can also be added to further improve the properties of the resulting composition.

20 Claims, No Drawings

STABILIZED POLYKETONE POLYMERS

FIELD OF THE INVENTION

This invention generally relates to polyketone polymers. In particular, this invention relates to new compositions of polyketones, and processes for making these compositions.

BACKGROUND OF THE INVENTION

The class of polymers of carbon monoxide and olefins has been known for some time. U.S. Pat. No. 2,495,286 (Brubaker) discloses such polymers of relatively low carbon monoxide content in the presence of free radical initiators, e.g., peroxy compounds. U.K. 1,081,304 discloses similar polymers of higher carbon monoxide content in the presence of alkylphosphine complexes of palladium compounds as catalyst. U.S. Pat. No. 3,694,412 (Nozaki) extended the reaction to produce linear alternating polymers in the presence of arylphosphine complexes of palladium moieties and certain inert solvents.

More recently, the class of linear alternating polymers of carbon monoxide and at least one ethylenically unsaturated hydrocarbon, now becoming known as polyketones or polyketone polymers, has become of greater interest. U.S. Pat. No. 4,880,903 (VanBroekhoven et al.) discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal selected from palladium, cobalt or nickel, the anion of a strong non-hydrohalogenic acid and a bidentate ligand of phosphorus, arsenic or antimony. U.S. Pat. No. 4,843,144 (VanBroekhoven et al.) discloses a process for preparing polymers of carbon monoxide and at least one ethylenically unsaturated hydrocarbon using the preferred catalyst comprising a compound of palladium, the anion of a non-hydrohalogenic acid having a pKa of below about 6 and a bidentate ligand of phosphorous.

The resulting polymers are relatively high molecular weight materials having established utility as premium thermoplastics in the production of shaped articles, such as containers for food and drink and parts for the automotive industry, which are produced by processing the polyketone polymer according to well known methods.

Although processes for producing polyketone polymers are well known, it is also well known that polymers produced by these processes have stability problems. See for example R. Gooden, et al., *Journal of Polymer Science: Part A: Polymer Chemistry*, Vol. 24, 3191-3199 (1986) and R. Gooden, et al., *New Trends in the Photochemistry of Polymers*, Applied Science p. 159 (1985).

These stability problems include ultraviolet (UV), melt stability, and heat aging stability, sometimes also referred to as continuous use temperature (CUT). While antioxidants and other additives provide some degree of improvement, it would be of advantage to provide new techniques and materials which yield further improvements in thermal oxidative stability of linear alternating polymers of carbon monoxide and at least one ethylenically unsaturated hydrocarbon. For most polymers including polyketones, thermal oxidative degradation leads to chain scission, reduction in molecular weight, and loss of physical properties. These adverse effects of oxidative chain scission reactions are undesirable, and continue to present a problem to those of skill in the art. Thus, there continues to exist the need to produce ethylene-CO polymers that have and exhibit superior continuous use temperature properties, and improved thermal stability.

It is a discovery of this invention that addition of suitable basic materials to polyketones leads to the formation of a thermoset thereby reducing the harmful effects of oxidative chain scission reactions and improving the thermal oxidative stability of the polyketone polymer.

SUMMARY OF THE INVENTION

It is a general object of this invention to produce polyketone polymers with improved thermal stability.

It is another object of this invention to provide a process for producing polyketone polymers having improved stability.

It is a particular object of this invention to provide a process of converting a thermoplastic polyketone into a thermoset polyketone polymer having thermoset properties, which possesses improved continuous use temperature (CUT) properties and thermal stability.

In accordance with this invention, it is hereby provided, a process for converting a thermoplastic linear alternating polymer of carbon monoxide and at least one ethylenically unsaturated hydrocarbon into a thermoset composition, having improved continuous use temperature and thermal stability properties. This process comprises the steps of adding a suitable basic material to the thermoplastic polymer and heating the resulting composition at elevated temperatures. Optionally, a lubricant or filler can also be added to the composition.

DETAILED DESCRIPTION OF THE INVENTION

In very generalized terms, the practice of this invention involves admixing a suitable basic material with a thermoplastic material of a linear alternating polymer of carbon monoxide and at least one ethylenically unsaturated hydrocarbon, and heating said mixture at elevated temperatures. This results in the formation of a thermoset material having improved continuous use temperature and thermal stability properties. Optionally, a suitable lubricant or filler can also be added to the mixture.

THE POLYMER

The polyketone polymers of the invention are of a linear alternating structure and contain substantially one molecule of carbon monoxide for each molecule of unsaturated hydrocarbon. Hereinafter, these polymers may sometimes be simply referred to as polyketones. Suitable ethylenically unsaturated hydrocarbons for use as precursors of the polyketone polymers have up to 20 carbon atoms inclusive, preferably up to 10 carbon atoms, and are aliphatic such as ethylene and other α-olefins including propylene, 1-butene, isobutylene, 1-hexene, 1octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenially unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

wherein G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the —CO-(-CH$_2$CH$_2$-)- units and the —CO-(-G-)- units are found randomly throughout the polymer chain, and preferred ratios of y:x are from about 0.01 to about 0.1. The end groups or "caps" of the polymer chain will depend upon what materials were present during the production of the polymer and whether or not how the polymer was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,843,144 (Van Broekhoven et al.). The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)phosphino]-propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

THE BASIC MATERIAL

The term suitable basic material as used herein, generally refers to basic materials that are capable of cross-linking polyketone polymers without adversely affecting their melt stability. As a class, these materials share the characteristic that their pH values can be effectively adjusted. It is believed that this pH adjustment is possible because these materials generally contain an excess amount of other functional groups, for example, acidic groups, such as carboxylic acids.

Broadly speaking, these materials are organic compounds exemplified by ionomers containing moieties of an α-olefin and an α-β-ethylenically unsaturated carboxylic acid which are partially neutralized with metal ions. Alkali metal ions, particularly sodium, potassium, and lithium, are the preferred metal ions for partial neutralization. These ionomers are more fully described at col. 3, lines 36 to col. 4, line 3 of U.S. Pat. No. 4,874,819 which is hereby incorporated by reference. Preferred amongst this sub-class of basic materials are (1) sodium neutralized ionomers of ethylene and methacrylic acid commercially available as "SURLYN ®" a trademark of DuPont, and (ii) sodium neutralized ionomers of ethylene and acrylic acid commercially available as ACLYN ®, a trademark of Allied-Signal Company.

These organic basic materials are used in this invention in an amount within the range of about 0.01 to about 10.0%, preferably from about 0.1 to about 3.0, with the most preferred range being from about 0.3 to about 1.0(%). These ranges are based on the weight of the total composition.

LUBRICANTS

In general, the optional addition of suitable lubricants to the blend does not adversely affect its melt stability. Rather, such an addition leads to an improvement in melt stability and processability. Suitable lubricants which are useful for the practice of this invention include polyethylene glycols (PEG); polyethylene glycol fatty acid (PEG-FA) derivatives; monoglycol fatty acid (MGFA) derivatives, particularly glyceryl monostearate; low molecular weight polymers (LMWP) such as polypropylene and polyethylene.

When used, these lubricants can be added to the thermoplastic polyketone in an amount within the range of from about 0.01 to about 1.0%, preferably from about 0.02% to about 0.5%, and most preferably from about 0.05% to about 0.1%. These ranges are based on the weight of the total composition.

CONVENTIONAL ADDITIVES

Conventional additives including plasticizers, mold release agents, pigments, fillers, and reinforcers may also be added to the blend. Additionally, conventional heat aging stabilizers singularly or collectively (as a package) may also added to polyketone. One such heat aging package consists of equal amounts of:

a) Naugard 445, chemically known as 4,4'-Di(1,1'-dimethylbenzyl)diphenylamine;

b) Naugard XL-1, chemically known as 2,2'Oxamido-bis(ethyl-3(3,5-di-t-butyl-4-hydroxyphenyl)propionate); and c) Ethanox 330, chemically known as, 2,4,6-Tris(3,5-di-t-butyl-4-hydroxybenzyl)-mesitylene. Henceforth, this combination of heat aging stabilizers will simply be referred to as "NNE Additive Package."

THE PROCESS

The polyketone polymers are stabilized according to the invention by the addition of a suitable basic material, conventional stabilizers, NNE Additive Package, and, optionally, a lubricant and/or filler followed by heating at elevated temperatures within the range of from about 100° to 200° C. The additives are added to the polymer by conventional methods suitable for forming an intimate mixture of the polymer and the additives. Such methods include dry blending of the polymer and additives in finely divided form followed by compression molding or by extrusion of the mixture. Alternatively, the stabilized composition is formed by blending the components in a mixing device operating at high shear. The composition is then formed into its final shape by a process such as extrusion, injection molding, or thermoforming.

The formation of a thermoset composition is accomplished by heating the above described compositions at a temperature of from about 100° to 200° C. This process may be carried out in a separate step by heating the product in an oven under inert conditions for an extended period of time. Alternatively, the formation of a thermoset may occur during the end use application of the product.

The following examples further illustrate various aspects of the invention.

EXAMPLE I

A linear alternating terpolymer of carbon monoxide, ethylene, and propylene was produced in the presence of a catalyst composition formed from palladium acetate, trifluoroacetic acid and 1,3-bis[di(2-methoxy-phenyl)-phosphino]propane. The terpolymer had a melting point of 220° C. and a limiting viscosity number, measured in m-cresol at 60° C., of 1.80 dl/g.

EXAMPLE II

A sample of the polyketone of Illustrative Embodiment I was blended with 1.5% NNE Additive Package (Compound I). A second sample of the polyketone of Illustrative Embodiment I was blended with 1.5% NNE Additive Package and with 0.5% Surlyn ® 8850 (Compound II). These two formulations were compounded on a Haake Buchler System 90 conical twin screw extruder. The processing conditions used are tabulated below:

| Rear Zone | 230° C. | 220–250° C. |
|---|---|---|
| Middle Zone | 235° C. | 225–255° C. |
| Front Zone | 240° C. | 230–260° C. |
| Die | 245° C. | 240–260° C. |
| Polymer Melt | 255° C. | 245–270° C. |
| Screw Speed | 45 RPM | 10–160 RPM |
| Barrel Residence Time | approx. 60 sec. | 30–90 sec. |

Tensile test bars were molded from the two compounds on a Boy 22S Molding Machine. The molding conditions used are tabulated below:

| Rear Zone | 230° C. | 220–250° C. |
|---|---|---|
| Front Zone | 240° C. | 230–260° C. |
| Nozzle | 240° C. | 230–260° C. |
| Mold Temp | 80° C. | 70–100° C. |
| Pressure | 700 psi | 500–1000 psi |
| Screw Speed | 130 RPM | 50–180 RPM |
| Injection Time | 15 sec. | 10–60 sec. |
| Cooling Time | 12 sec. | 5–60 sec. |

The tensile test bars were aged in forced air circulating ovens at 120° C. and at 130° C. Samples were removed periodically for testing. The results obtained are as tabulated below:

| | Time to 30% loss of tensile strength | |
|---|---|---|
| | 120° C. | 130° C. |
| Compound 1 | 42 days | 25 days |
| Compound 2 | 56 days | 35 days |

The thermoset nature of Compound 2 is evidenced by a lack of heat sagging of the heat aged sample vs. marked sagging of the Compound 1 sample. Dynamic mechanical testing also shows that the modulus of Compound 1 drops by more than four orders of magnitude at the melting point and the sample loses physical integrity while the modulus of Compound 2 drops only one order of magnitude at the melting point and the sample maintains physical integrity. This further shows that the inventive compositions have superior stability properties.

While this invention has been described in detail for purposes of illustration, it is not to be construed as limited thereby but is intended to cover all changes and modifications within the spirit and scope thereof.

That which is claimed is:

1. A stabilized thermoset heat treated polyketone polymer composition having improved continuous use temperature and thermal stability properties comprising:

a) a linear alternating polymer of carbon monoxide and at least one ethylenically unsaturated hydrocarbon; and b) a suitable basic material capable of crosslinking a thermoplastic polyketone resin without adversely affecting its melt stability, said basic material selected from the group consisting of neutralized ionomers of ethylene and methacrylic acid or acrylic acid.

2. A composition as in claim 1 further comprising a lubricant.

3. A composition as in claim 1 further comprising at least one heat aging stabilizer.

4. A composition as in claim 1 wherein the polymer is of the repeating formula

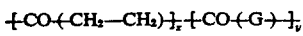

wherein G is a moiety of an ethylenically unsaturated hydrocarbon of at least 3 carbon atoms, polymerized through the ethylenic unsaturation, and the ratio of y:x is no more than about 0.5.

5. A composition as in claim 4 wherein y is 0.

6. A composition as in claim 1 wherein the basic material comprises ionomers containing moieties of an $\alpha$-olefin and an $\alpha$-$\beta$ ethylenically unsaturated carboxylic acids which are partially neutralized with metal ions.

7. A composition as in claim 1 in which the basic material is a sodium neutralized ionomer of ethylene and acrylic acid.

8. A composition as in claim 1 in which the basic material is a sodium neutralized ionomer of ethylene and methacrylic acid.

9. A composition as in claim 6 comprising from about 0.01 to 10.0% of the basic material.

10. A composition as in claim 7 comprising from about 0.3 to 1.0% of the basic material.

11. A composition as in claim 8 comprising from about 0.3 to 1.0% of the basic material.

12. A composition as in claim 1 further comprising a lubricant selected from the group consisting of polyethylene glycols, polyethylene glycol fatty acid derivatives, monoglycol fatty acid derivatives, or low molecular weight polymers.

13. A composition as in claim 12 comprising from about 0.01 to 1.0% of lubricant.

14. A composition as in claim 1 further comprising at least one heat aging stabilizer.

15. A composition as in claim 14 wherein said heat aging stabilizer essentially consists of 4,4'-Di(1,1'-dimethyl-benzyl)diphenylamine; 2,2'Oxamido-bis(ethyl-3(3,5-di-t-butyl-4-hydroxyphenyl)propionate), and 2,4,6-Tris(3,5-di-t-butyl-4-hydroxybenzyl)-mesitylene.

16. A thermoplastic polyketone polymer composition convertible into a thermoset polymer composition having improved continuous use temperature and thermal stability properties comprising:
    a) a linear alternating polymer of carbon monoxide and at least one ethylenically unsaturated hydrocarbon; and
    b) a suitable basic material capable of crosslinking a thermoplastic polyketone resin without adversely affecting its melt stability said basic material selected from the group consisting of neutralized ionomers of ethylene and methacrylic acid or acrylic acid.

17. A process of preparing a stabilized thermoset polymer of a linear alternating polymer of carbon monoxide and at least one ethylenically unsaturated hydrocarbon, having improved continuous use temperature and thermal stability properties, comprising the steps of:
    a) admixing a thermoplastic resin of a linear alternating polymer of carbon monoxide at least one ethylenically unsaturated hydrocarbon, a suitable basic material capable of crosslinking said thermoplastic resin without adversely affecting its melt stability, said basic material selected from the group consisting of neutralized ionomers of ethylene and methacrylic acid or acrylic acid and
    b) heating said mixture to a temperature in the range of from about 100°-200° C.

18. A product as in claim 17 further comprising a lubricant and at least one heat aging stabilizer.

19. A thermoset resin made by the process of claim 17.

20. An article of manufacture made from the resin of claim 17.